Oct. 4, 1966
C. F. BURMASTER ETAL  3,276,973
RECOVERY OF KETONES FROM ACID SOLUTIONS BY DISTILLATION
IN THE PRESENCE OF AN AQUEOUS ALKALI
Filed March 1, 1963
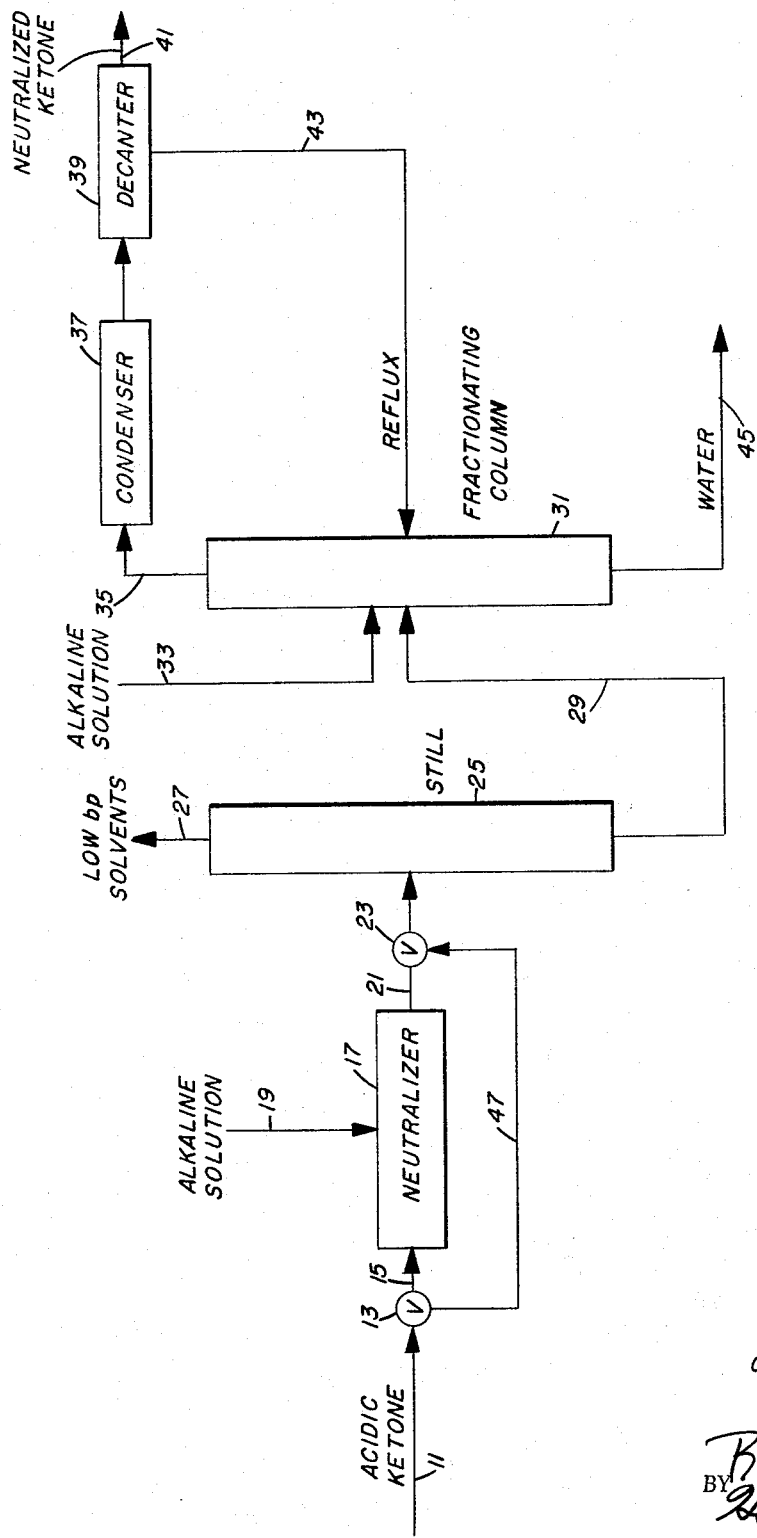
CHESTER F BURMASTER
JOSEPH C. JOHNSTON
INVENTORS
BY R. Frank Smith
Henry M. Chapin
ATTORNEYS

3,276,973
RECOVERY OF KETONES FROM ACID SOLUTIONS BY DISTILLATION IN THE PRESENCE OF AN AQUEOUS ALKALI

Chester F. Burmaster and Joseph C. Johnston, Rochester, N.Y., assignors to Eastman Kodak Company, Rochester, N.Y., a corporation of New Jersey
Filed Mar. 1, 1963, Ser. No. 262,214
3 Claims. (Cl. 203—37)

This invention relates to the recovery of ketones, and more particularly to the recovery of neutral ketones from mixtures thereof with acidic components.

Commercially available ketones frequently contain sufficient amounts of acidic components to have a pH in the range of 4.5 to 5.5. Also ketones recovered from various industrial processes may be acidic. The presence of acidity in ketones prohibits their use in certain applications such as a solvent in certain coating operations A typical example is the coating of magnetic oxide dispersions in the manufacture of magnetic tape where traces of acid may interfere with the binder.

The recovery of neutral ketones from acidic mixtures containing ketones presents problems when distillation thereof is effected in copper or iron systems due to equipment deterioration and discoloration of the ketone from the corrosion products developed. In addition, polymerization of the ketone may occur when heated in anhydrous alkaline systems. These polymerization products tend to coat and foul heat transfer surfaces in recovery equipment.

One object of our invention is to recover neutral ketones from acidic mixtures containing ketones. Another object of our invention is to separate neutral ketones from acidic solutions containing ketones without damaging the recovery equipment and under conditions whereby the ketone is not discolored. A further object of our invention is to recover neutral ketones from acidic solutions containing ketones while preventing polymerization of the ketones in the recovery equipment. Other objects of our invention will appear herein.

These and other objects of our invention are accomplished by neutralizing a solvent mixture containing a ketone with an aqueous alkaline solution, removing any low boiling constituents and distilling the ketone or its water azeotrope while continuously contacting the vapor with a counter current of aqueous alkali.

The invention will be described in more detail below by reference to the single sheet of drawing, which is a schematic flow diagram showing an arrangement of equipment for performing the novel method.

Referring to the drawing, the method as described specifically in Example 1 hereinafter is performed by feeding the acidic ketone-containing mixture through a line 11, a three-way valve 13 and a line 15 to a neutralizer vessel 17 such as a large iron pot. Aqueous alkaline solution, such as aqueous sodium hydroxide, is fed through a line 19 into the neutralizer to react with the acid content and neutralize the mixture which is then fed by a line 21 and a three-way valve 23 to a still 25 wherein low-boiling solvents such as alcohols and methylene dichloride are vaporized and removed through an overhead line 27 by simple distillation.

Liquid leaves the bottom of the still 25 through a line 29 and is injected continuously into a fractionating column 31 where it is counter-currently contacted with aqueous sodium hydroxide introduced through a line 33 to neutralize any volatile acidity. Overhead from the fractionating column 31 passes by a line 35 to a condenser 37, and the condensate is discharged to a decanter vessel 39 wherein a gravity separation occurs. The neutral ketone forms a top layer which is decanted off as neutralized ketone product through a line 41. The heavy aqueous bottom layer is removed from the bottom of the decanter 39 by a line 43 and returned as reflux to the fractioning column 31.

Using the same equipment described above, the method as described specifically in Example 2 hereinafter, is performed by adjusting the three-way valves 13 and 23 so that the acidic ketone-containing mixture passes from the line 11 around the neutralizer 17 by way of a by-pass line 47 and thence into the still 25. Subsequent flow is as described above. In this modification all neutralization of acid takes place in the fractionating column 31.

Our invention will be further illustrated by the following examples. Example 1 shows a batch system for the recovery of neutral methyl isobutyl ketone from an acidic mixture thereof.

Example 1

63,000 pounds of acidic waste solvent from a magnetic tape coating operation, containing methyl isobutyl ketone, methyl alcohol, isopropyl alcohol, and methylene dichloride were charged into a 10,000 gallon iron pot. The mixture was neutralized in the pot by the addition of 150 pounds of 50 percent by weight aqueous sodium hydroxide. The lower boiling solvents (alcohols and methylene dichloride) were removed by ordinary distillation. The methyl isobutyl ketone-water azeotrope, which had a boiling point of 190° F., was distilled through a 34 plate copper fractionating column while counter-currently contacting the distillate with 5 gallons per hour of 5 percent by weight aqueous sodium hydroxide introduced into the 26th plate. 2,500 pounds per hour of condensate were returned directly as reflux while 2,500 pounds per hour were continuously decanted. The heavy aqueous layer from the decanter was returned as reflux to the column at approximately an 800 pound per hour rate. The neutralized ketone layer was removed from the system at a rate of approximately 1,700 pounds per hour. The ketone recovered was not discolored, and the iron pot had not been attacked by the operation. The ketone did not polymerize in the distillation column. The ketone which was recovered had a pH of about 7.

Example 2 shows a continuous method of recovering neutral ketones from acidic mixtures of the ketone.

Example 2

Waste solvent as described in Example 1 as the starting material was freed of lower boiling solvents by ordinary distillation and then continuously fed into a fractionating column. A portion of the condensed distillate, ketone-water azeotrope, was returned directly as reflux to the column and the rest was continuously decanted as in the batch system described in Example 1. A stream of aqueous alkali, sufficient in quantity to neutralize any volatile acidity, was fed to the column at the 26th plate. The column was operated with live steam and water was removed as a waste stream from the bottom of the column. The ketone recovered was neutral, having a pH of about 7. The copper plates of the distillation column were not fouled by polymerized ketone.

The aqueous alkali employed in the present invention may be any one or a combination of the usual alkalis, i.e., the hydroxides and carbonates of sodium, potassium, lithium, and cesium. Extremely suitable are sodium hydroxide, potassium hydroxide, sodium carbonate, and potassium carbonate.

The concentration of aqueous alkali may be varied over a wide range. For example, the sodium hydroxide concentration could vary from 0.5 percent to 50 percent and the amount of sodium hydroxide in such solution could vary from 10 to 100 pounds per hour under the conditions of Example 1.

The ketones which may be recovered from waste solutions in accordance with our invention include those having 3 to 8 carbon atoms, such as acetone, methyl ethyl ketone, diethyl ketone, ethyl n-propyl ketone, di-iso-propyl ketone, iso-propyl-n-butyl ketone and di-n-butyl ketone. Our process is particularly useful in recovering ketones having 6 carbon atoms, and especially methyl isobutyl ketone.

The acids from which the ketones may be separated include both organic and inorganic acids. The process of the invention is especially satisfactory in recovering ketones from mixtures containing hydrochloric acid.

The invention has been described in detail with particular reference to preferred embodiments thereof but it will be understood that variations and modifications can be effected within the spirit and scope of the invention as described hereinabove and as defined in the appended claims.

We claim:

1. The method of continuously recovering neutral methyl isobutyl ketone from a mixture essentially consisting of methyl isobutyl ketone and acid which comprises continuously feeding said mixture into a fractional distillation column, continuously distilling said mixture, continuously contacting the distillate vapors with a counter current stream of aqueous alkali, continuously condensing the distillate stream, and continuously decanting the neutral methyl isobutyl ketone.

2. The method in accordance with claim 1 also comprising, prior to feeding said mixture into said fractional distillation column, forming said mixture by treating with aqueous alkali an initial waste mixture containing methyl isobutyl ketone, acid, and organic solvents having a lower boiling point than methyl isobutyl ketone; and distilling off such organic solvents.

3. The method in accordance with claim 1 also comprising, prior to feeding said mixture into a fractional distillation column, forming said mixture from an initial waste mixture containing methyl isobutyl ketone, acid, and organic solvents having a lower boiling point than methyl isobutyl ketone; and distilling off such organic solvents.

References Cited by the Examiner

UNITED STATES PATENTS

| | | | |
|---|---|---|---|
| 2,254,615 | 9/1941 | McAllister et al. | 260—593 |
| 2,429,484 | 10/1947 | Peters | 202—57 |
| 2,575,244 | 11/1951 | Carlson et al | 202—57 |
| 2,614,072 | 10/1952 | Carlson et al. | 202—57 |
| 2,662,848 | 12/1953 | Emerson et al. | 202—57 |
| 2,906,675 | 9/1959 | Hall et al. | 202—57 |
| 2,906,676 | 9/1959 | Bewley et al. | 202—57 |
| 2,971,894 | 2/1961 | Kendall | 202—57 |

NORMAN YUDKOFF, *Primary Examiner.*

GEORGE D. MITCHELL, *Examiner.*

W. BASCOMB, *Assistant Examiner.*